United States Patent
Fukukawa et al.

(10) Patent No.: US 12,188,577 B2
(45) Date of Patent: Jan. 7, 2025

(54) BUTTERFLY VALVE

(71) Applicant: CKD CORPORATION, Komaki (JP)

(72) Inventors: Nobuhiro Fukukawa, Komaki (JP);
Hiroki Kadoya, Komaki (JP);
Yasunori Nishimura, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 18/279,001

(22) PCT Filed: Apr. 1, 2022

(86) PCT No.: PCT/JP2022/016993
§ 371 (c)(1),
(2) Date: Aug. 25, 2023

(87) PCT Pub. No.: WO2022/215667
PCT Pub. Date: Oct. 13, 2022

(65) Prior Publication Data
US 2024/0142001 A1   May 2, 2024

(30) Foreign Application Priority Data
Apr. 6, 2021   (JP) .................................. 2021-064744

(51) Int. Cl.
*F16K 41/00*   (2006.01)
*F16J 15/43*   (2006.01)
*F16K 1/226*   (2006.01)

(52) U.S. Cl.
CPC ............. *F16K 41/003* (2013.01); *F16J 15/43* (2013.01); *F16K 1/226* (2013.01)

(58) Field of Classification Search
CPC ...... F16K 1/22; F16K 27/0218; F16K 41/003; F16K 41/026; F16J 15/43
See application file for complete search history.

(56) References Cited

U.S. PATENT DOCUMENTS 4,899,899 A * 2/1990 Junier .................... F16K 41/04
                                                            220/581
6,192,603 B1   2/2001 Seita
(Continued)

FOREIGN PATENT DOCUMENTS

JP   2000-074227 A   3/2000
JP   2019-019851 A   2/2019
(Continued)

OTHER PUBLICATIONS

Translation of KR 100748179.*
(Continued)

*Primary Examiner* — Kevin F Murphy
(74) *Attorney, Agent, or Firm* — Oliff PLC

(57) ABSTRACT

A butterfly valve includes a purge gas flow path supplying a purge gas for preventing inflow of a control fluid into a magnetic fluid sealing portion from a flow path through an insertion hole. The purge gas flow path is provided with an opening and closing valve for opening and closing the purge gas flow path and a pressure gauge for measuring a pressure value in the purge gas flow path, in the stated order from the upstream side. The purge gas flow path is connected to a portion between the magnetic fluid sealing portion and the flow path of the butterfly valve on the downstream side of the pressure gauge, and communicates with the flow path through the insertion hole. The butterfly valve further includes a control device that controls at least the opening and closing valve. The control device is provided with a monitoring program for monitoring a pressure value.

10 Claims, 6 Drawing Sheets

(56) References Cited

U.S. PATENT DOCUMENTS

2016/0109035 A1\* 4/2016 McCarty ................ F16K 41/02
                                                        277/517
2016/0312899 A1\* 10/2016 Shimazaki ............... F16J 15/16
2020/0041003 A1 2/2020 Sumikawa

FOREIGN PATENT DOCUMENTS

KR        100748179 B1 \*  8/2007
WO      2018/190148 A1    10/2018

OTHER PUBLICATIONS

May 10, 2022 International Search Report issued in International Patent Application No. PCT/JP2022/016993.
Oct. 10, 2023 International Preliminary Report on Patentability issued in International Patent Application No. PCT/JP2022/016993.

\* cited by examiner

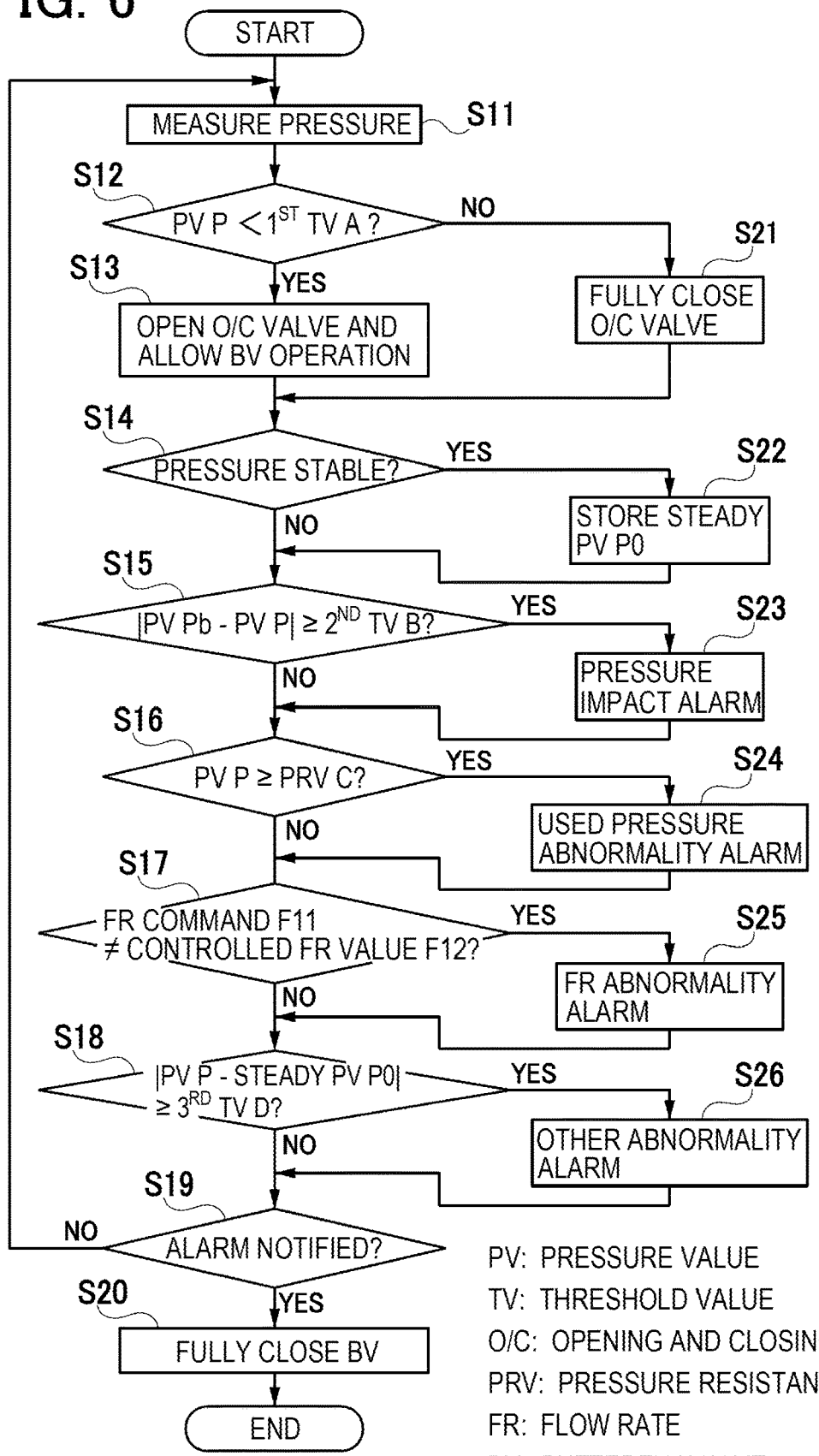

BUTTERFLY VALVE

CROSS-REFERENCE

This application is a US national phase application of International Application No. PCT/JP2022/016993, filed on Apr. 1, 2022, and claiming the priority of Japanese Application No. 2021-064744, filed Apr. 6, 2021, whose entire disclosures are incorporated herewith by reference.

TECHNICAL FIELD

The present invention relates to a butterfly valve provided with a motor, a flow path in which control fluid flows, a rod having one end connected to the motor and the other end inserted in the flow path, and a butterfly valve element joined to the rod in the flow path.

BACKGROUND ART

Heretofore, in many cases of a semiconductor manufacturing process, a butterfly valve having large conductance of a flow path is installed as a vacuum pressure control device between a vacuum chamber and a vacuum pump for controlling a vacuum pressure in the vacuum chamber. One example of the butterfly valve has been disclosed in Patent Literature 1 as a butterfly valve which is configured by joining a drive section provided with a motor and a valve section provided inside with a flow path and a butterfly valve element. The butterfly valve 1 is configured such that a rod connected to the motor extends from the drive section and is inserted in the flow path through an insertion hole provided in the valve section to be joined to the butterfly valve element.

RELATED ART DOCUMENTS

Patent Documents

Patent Literature 1: JP2019-19851A

SUMMARY OF INVENTION

Problems to be Solved by the Invention

In recent years, the spread of Atomic Layer Deposition (ALD) method facilitates acceleration in a manufacturing cycle of semiconductors. In association to this, a rod of a butterfly valve has been demanded for high endurance to endure a several tens of millions of rotation times. In a butterfly valve disclosed in the patent literature 1, an O-ring is provided on an outer circumferential surface of the rod so that the control fluid such as process gas is prevented from flowing outside the butterfly valve from a flow path through an insertion hole in which the rod is inserted. However, this O-ring does not have enough endurance for rotation of several tens of millions of times.

To address the above, the present applicant has proposed a butterfly valve as disclosed in Japanese patent application No. 2020-009768. The butterfly valve is formed with a magnetic fluid sealing portion on a rod outer circumference between the motor and the valve section, and this magnetic fluid sealing portion shuts off the process gas which tends to flow outside the butterfly valve from the flow path through the insertion hole. The magnetic fluid sealing portion has the characteristics of being hardly degraded even by the several tens of millions of times of rod's rotation and the characteristics of having higher sealing endurance to the rotation of the rod as compared with the O-ring.

Further, the butterfly valve disclosed in Japanese patent application No. 2020-009768 is provided with a purge-gas flow path communicated with the flow path via the insertion hole. Flow of the purge gas from the purge-gas flow path via the insertion hole makes it possible to thrust back the process gas, which tends to intrude a drive section side via the insertion hole from the flow path, into the flow path.

The above-mentioned magnetic fluid sealing member can hold the magnetic fluid by the magnetic force. Therefore, when the magnetic fluid sealing portion is loaded with pressure exceeding a force for holding the magnetic fluid by the magnetic force, the magnetic fluid sealing portion could be damaged.

There is exemplified the following case as an example of excessive pressure being loaded on a magnetic fluid sealing portion. Specifically, while a vacuum pump is out of operation, namely, when purge gas is supplied to a butterfly valve in a state in which a flow path of a butterfly valve is not under a negative pressure state, the purge gas is stored in the flow path, thereby increasing the pressure in the butterfly valve. Further, during operation of the vacuum pump, namely, when the purge gas has not been supplied for a long time, that is, the flow path in the butterfly valve is under the negative pressure, the pressure in the flow path decreases, so that inside the butterfly valve is brought into the highly vacuumed state. This increase in the pressure or the negative-pressure state in the butterfly valve could result in loading of excessive pressure on the magnetic fluid sealing portion, which could further cause breakage of the magnetic fluid sealing portion. Accordingly, there needs to control start and halt of purge gas supply for protection of the magnetic fluid sealing portion.

The present invention has been made for solving the above problem and has a purpose of providing a butterfly valve achieving prevention of breakage of the magnetic fluid sealing portion by preventing load of excessive pressure on the magnetic fluid sealing portion.

Means of Solving the Problems

To solve the above problem, a butterfly valve according to one aspect of the present invention has the following configuration.

A butterfly valve has a feature that the butterfly valve comprises: a motor; a flow path in which a control fluid flows; a rod having one end joined to the motor and the other end inserted in the flow path; and a butterfly valve element joined to the rod in the flow path, wherein the butterfly valve comprises a magnetic fluid sealing portion between the motor and the flow path, the magnetic fluid sealing portion is configured to prevent leakage of the control fluid from the flow path to the motor through an inserted portion of the flow path in which the rod is inserted, the butterfly valve comprises a purge gas flow path to supply purge gas to the butterfly valve, the purge gas preventing inflow of the control fluid to the magnetic fluid sealing portion through the inserted portion from the flow path, the purge gas flow path is provided with an opening and closing valve to open and close the purge gas flow path and a pressure gauge to measure a pressure value of the purge gas flow path in this order from an upstream side, the purge gas flow path is connected between the magnetic fluid sealing portion and the flow path of the butterfly valve and communicated with the flow path through the inserted portion on a downstream side of the pressure gauge, the butterfly valve comprises a control device to control at least the opening and closing valve, and the control device includes a monitoring program to monitor the pressure value.

Effects of the Invention

The butterfly valve of the present invention comprises the control device, and the control device controls at least the opening and closing valve, which opens and closes the purge gas flow path, and measures the pressure value in the purge gas flow path to monitor the pressure value by the monitoring system. The purge gas flow path is connected between the magnetic fluid sealing member and the flow path of the butterfly valve on the downstream side of the pressure gauge, and accordingly, measuring and monitoring the pressure value of the purge gas flow path are synonymous with measuring and monitoring the pressure loaded on the magnetic fluid sealing portion.

While measuring and monitoring the pressure value of the purge gas flow path (namely, while measuring and monitoring the pressure loaded on the magnetic fluid sealing portion), the control device controls the opening and closing valve to manage start and halt of the purge gas supply. Thus, the magnetic fluid sealing portion can be prevented from being loaded with excessive pressure, further preventing breakage of the magnetic fluid sealing portion. Further, the purge gas flow path is communicated with the flow path by the inserted portion in which the rod has been inserted, and thus it is also possible to detect an abnormal state of the flow path by measuring and monitoring the pressure value of the purge gas passage.

BRIEF DESCRIPTION OF THE DRAWINGS

FIG. 6 is a flowchart indicating an operation process of a monitoring program.

MODE FOR CARRYING OUT THE INVENTION

Figure 1:
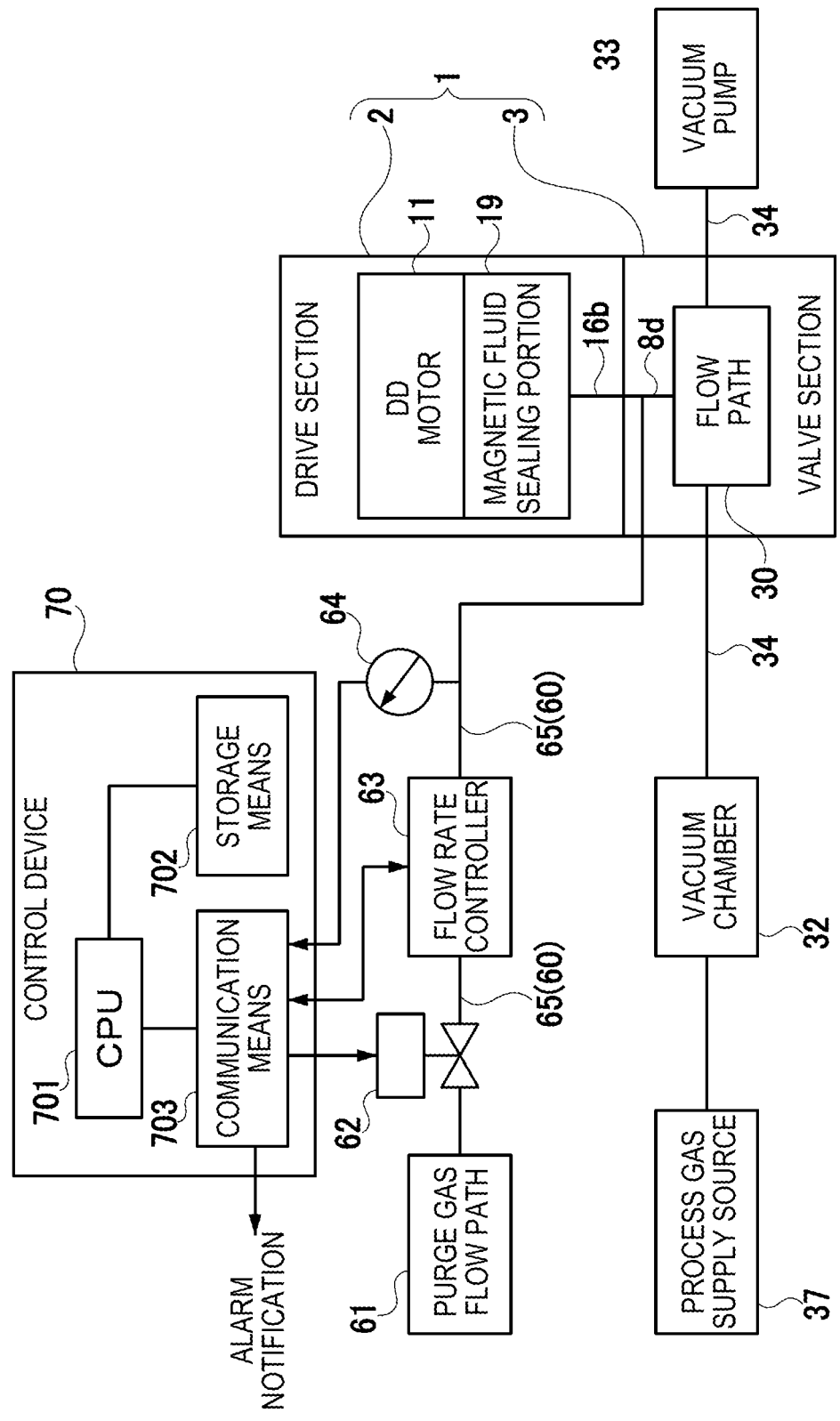
FIG. 1 is a schematic diagram of a vacuum pressure control system utilizing a butterfly valve according to the present embodiment.

An embodiment of a butterfly valve according to the present invention is explained in detail with reference to the accompanying drawings. FIG. 1 is a schematic diagram of a vacuum pressure control system utilizing a butterfly valve 1 according to the present embodiment.

The butterfly valve 1 of the present embodiment is used for a semiconductor manufacturing process. For example, as shown in FIG. 1, the butterfly valve 1 is arranged on a pipe 34 connecting a vacuum chamber 32 for deposition on a wafer and a vacuum pump 33 for performing discharge of the vacuum chamber 32, and the butterfly valve 1 is used as a vacuum pressure control device for controlling the pressure in the vacuum chamber 32 in which process gas (one example of control fluid) is supplied from a process gas supply source 37.

Figure 2:
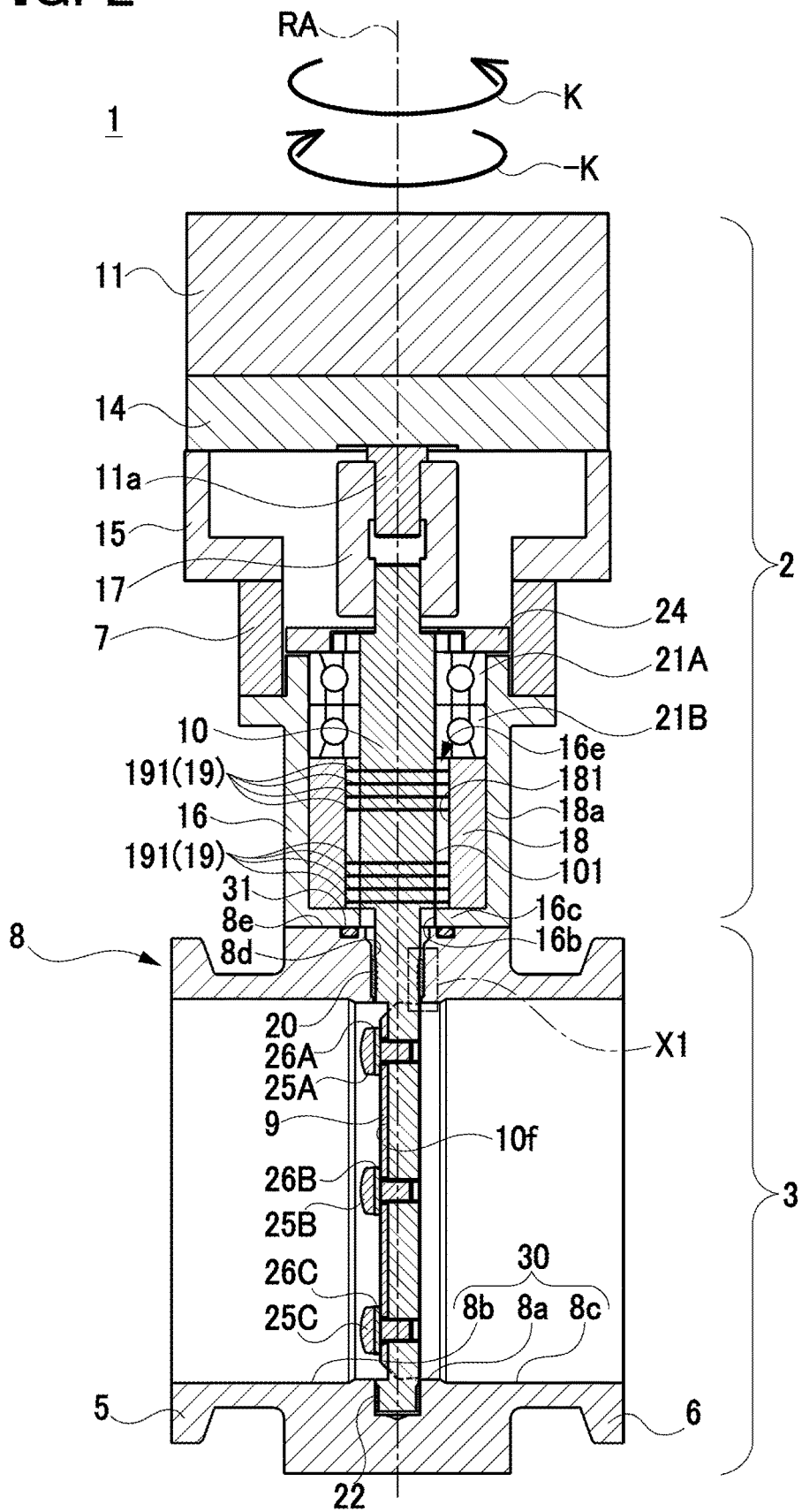
FIG. 2 is a sectional view of the butterfly valve according to the present embodiment taken along a direction parallel to an axis of a rotary shaft and parallel to a flow path.
Figure 3:
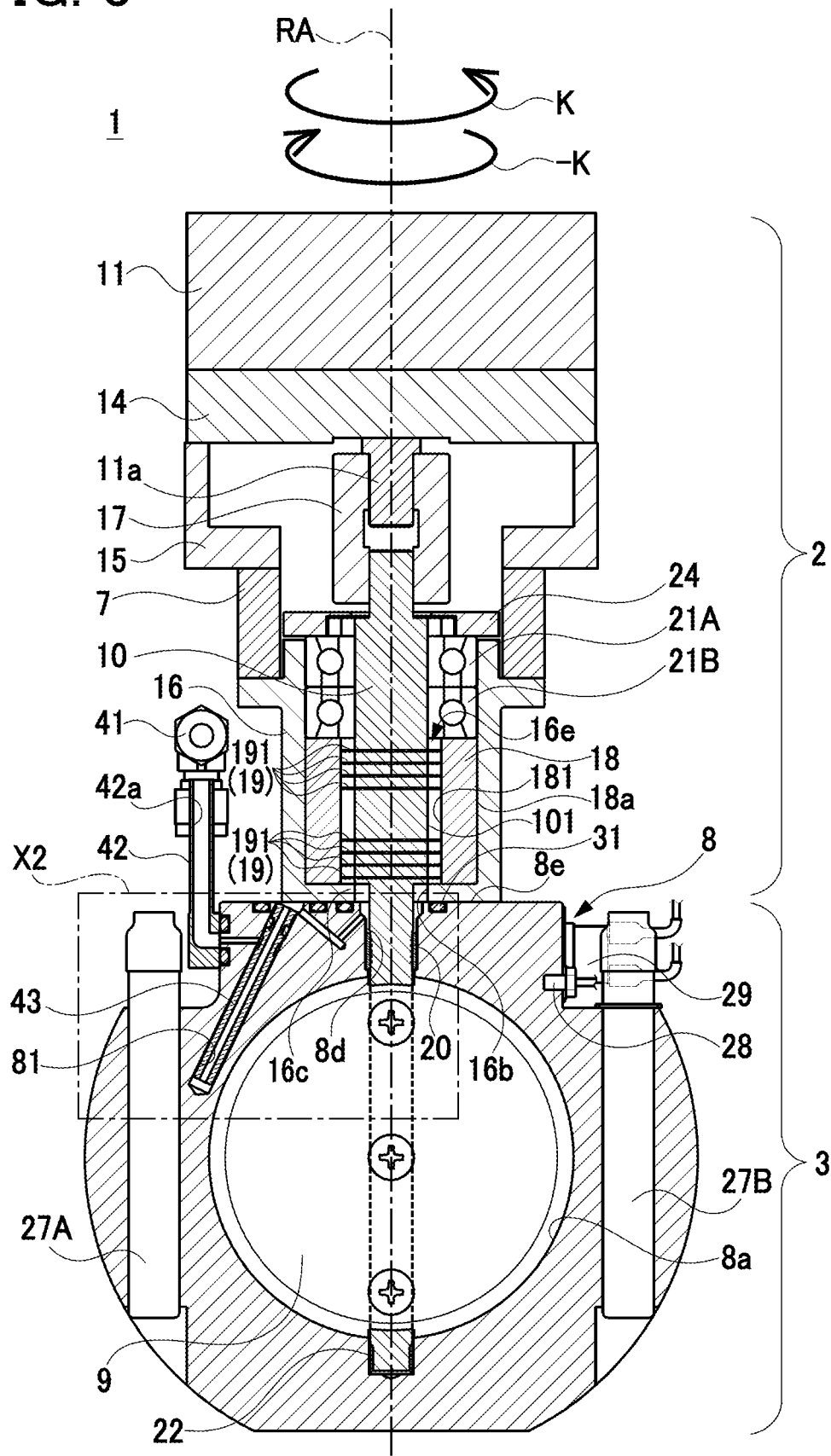
FIG. 3 is a sectional view of the butterfly valve according to the embodiment taken along a direction parallel to the axis of the rotary shaft and orthogonal to the flow path.
Figure 4:
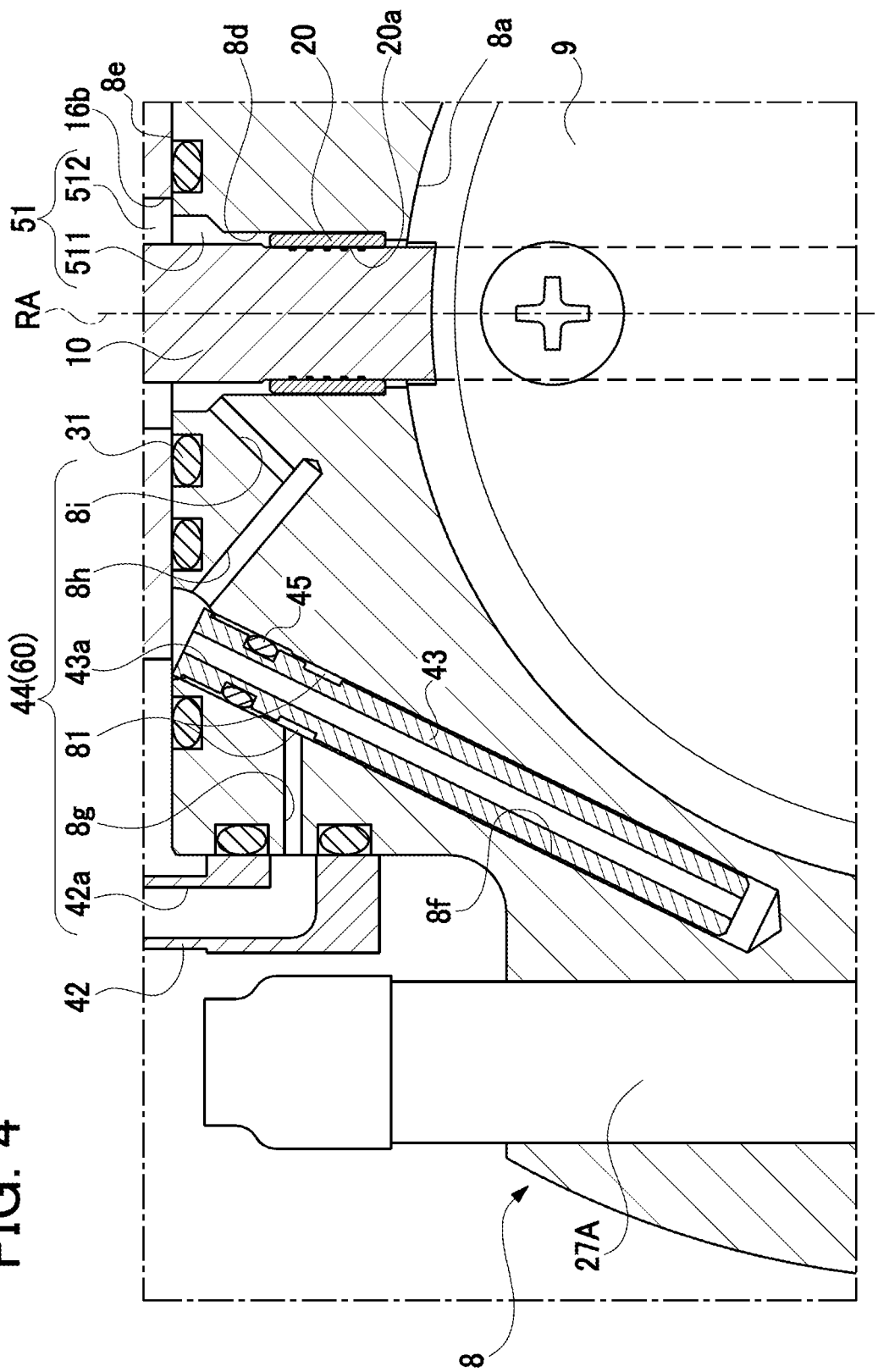
FIG. 4 is a partial enlarged view of a part X2 in FIG. 3.
Figure 5:
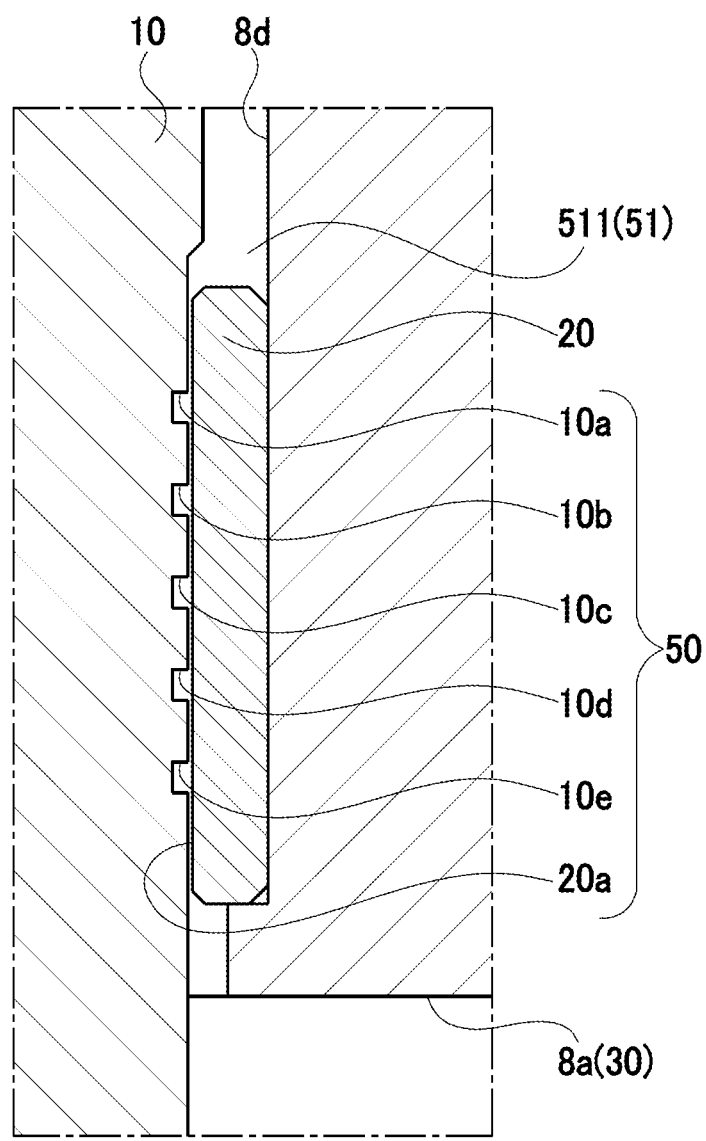
FIG. 5 is a partial enlarged view of a part X1 in FIG. 2.

FIG. 2 is a sectional view of the butterfly valve 1 according to the present embodiment, taken along a direction parallel to an axis RA of a rotary shaft 11a and also parallel to a flow path 30. FIG. 3 is another sectional view of the butterfly valve 1 according to the present embodiment, taken along a direction parallel to the axis RA of the rotary shaft 11a and orthogonal to the flow path 30. Both FIG. 2 and FIG. 3 illustrate the butterfly valve 1 in its valve-closed state. Further, FIG. 4 is a partial enlarged view of a part X2 in FIG. 3. FIG. 5 is a partial enlarged view of a part X1 in FIG. 2.

As shown in FIG. 2 and FIG. 3, the butterfly valve 1 is configured with a drive section 2 and a valve section 3. The drive section 2 includes a direct-drive motor (one example of a motor, hereinafter referred as a DD motor) 11 having high endurance. The DD motor 11 includes no intermediate structure such as a decelerator, and thus the drive section 2 can achieve improvement in responsivity, speed stability, and positioning accuracy as well as achieving size reduction and noise reduction. Accordingly, accuracy in the vacuum pressure control by the butterfly valve 1 is enhanced. Further, the DD motor 11 includes the rotary shaft 11a as shown in FIG. 2 and FIG. 3, and a rotary center of the rotary shaft 11a is defined as the axis RA.

The rotary shaft 11a is connected with one end (an upper end in FIG. 2 and FIG. 3) of a rod 10 via a metal-plate-spring type coupling 17. Even if the rod 10 is heated by process gas (for example, gas at about 200° C.) flowing through the flow path 30 explained below, the coupling 17 makes it hard to transmit this heat to the DD motor 11.

Further, the drive section 2 is configured by stacking and joining a housing 16, a heat insulation member 7, a heat sink 15, and the DD motor 11. The drive section 2 includes the heat sink 15 and the heat insulation member 7 between the DD motor 11 and the valve section 3, and thus even if the valve section 3 is heated by the heat, generated by the process gas and heaters 27A and 27B explained below, the subject heat is hardly transmitted to the DD motor 11.

The housing 16 is formed to be in a hollow cylindrical shape and inserted therein with the rod 10. Further, a magnetic member 18 of a cylindrical shape to surround an outer circumferential surface of the rod 10 is placed coaxially with the rod 10. An inner diameter of the magnetic member 18 is formed to be larger than an outer diameter of the rod 10, and a cavity 16e is formed between an inner circumferential surface 181 of the magnetic member 18 and an outer circumferential surface 101 of the rod 10. In the cavity 16e, a magnetic fluid held by a magnetic force of the magnetic member 18 forms a plurality of films along the axis RA, and these plural films 191 constitute a magnetic fluid sealing portion 19.

An O-ring 31 is provided between the housing 16 and the valve section 3, and this O-ring 31 hermetically closes the flow path 30 and a buffer space 51 which will be explained later.

On one side of the magnetic fluid sealing portion 19 closer to the DD motor 11, two ball bearings 21A and 21B are arranged adjacent to each other in an axial direction of the rod 10, and these ball bearings 21A and 21B journal the rod 10 in a rotatable manner. The ball bearings 21A and 21B are held to be fixed by a bearing retainer 24 and the magnetic member 18 in an upper and lower direction in FIG. 2 and FIG. 3.

Further, the housing 16 includes a through hole 16b having an inner diameter larger than an outer diameter of the rod 10 on an end portion 16c on a side of the valve section 3, and the rod 10 inserted in the housing 16 is further inserted in the valve section 3 through the through hole 16b.

The valve section 3 coupled with the drive section 2 includes a valve body 8 and a butterfly valve element 9. The valve body 8 is made of stainless-steel having corrosion resistance and thermal resistance.

The valve body 8 is provided on its left end portion in FIG. 2 with a joint 5 and on its right end portion in FIG. 2 with a joint 6. An inner wall of the joint 5 is formed with an input-side passage 8*b* and an inner wall of the joint 6 is formed with an output-side passage 8*c*. In between the input-side passage 8*b* and the output-side passage 8*c*, a valve hole 8*a* having an inner wall of a circular arcuate shape in section in FIG. 3 is formed. The input-side passage 8*b* and the output-side passage 8*c* are coaxially provided and communicated as shown in FIG. 2, and thus a series of the flow path 30 is configured. In the semiconductor manufacturing process, for example, the joint 5 is connected to the vacuum chamber 32 (see FIG. 1) and the joint 6 is connected to the vacuum pump 33 (see FIG. 1) respectively via the pipe 34 (see FIG. 1), and thus discharge of the vacuum chamber 32 is performed by the flow path 30.

Also, the valve body 8 is provided with a thermocouple 28 as a temperature sensor to measure a temperature of the valve body 8 as shown in FIG. 3. The valve body 8 is further provided with a pair of the heaters 27A and 27B which are disposed to hold the valve hole 8*a* in a diametrical direction so that a fluid flowing through the flow path 30 is maintained with its temperature. The heaters 27A and 27B are cartridge heaters and are connected to an external control device (not shown) outside the butterfly valve 1. The heaters 27A and 27B are controlled to be ON or OFF based on a measured value of the thermocouple 28 by the control device in order to adjust the temperature of the valve body 8. The valve body 8 is further provided with a thermostat 29. The thermostat 29 is to be operated when the heaters 27A and 27B runaway to excessively heat the valve body 8. When the thermostat 29 is operated, the control device stops operation of the heaters 27A and 27B.

Further, the valve body 8 includes an insertion hole 8*d* (one example of an inserted portion) which penetrates from an end face (hereinafter, referred as an upper end face 8*e*) joined to the drive section 2 to the valve hole 8*a*. This insertion hole 8*d* is coaxially positioned with the through hole 16*b* of the housing 16 and communicated with the through hole 16*b*. In other words, the cavity 16*e* formed with the magnetic fluid sealing portion 19 and the flow path 30 are communicated by the through hole 16*b* and the insertion hole 8*b*. In FIG. 1, the magnetic fluid sealing portion 19 is illustrated as being connected with the flow path 30 by the through hole 16*b* and the insertion hole 8*d*, and this illustration schematically represents a state in which the cavity 16*e* formed with the magnetic fluid sealing portion 19 and the flow path 30 are communicated by the through hole 16*b* and the insertion hole 8*d*.

The cavity 16*e* formed with the magnetic fluid sealing portion 19 and the flow path 30 are communicated, and thus, when the process gas discharged from the vacuum chamber 32 flows in the flow path 30, the process gas tends to intrude in the drive section 2 from the insertion hole 8*d*. However, the cavity 16*e* of the housing 16 is formed with the magnetic fluid sealing portion 19 for blocking the process gas, so that the process gas cannot reach the DD motor 11. Thus, it is possible to prevent outflow of the process gas out of the butterfly valve 1, which could cause outside-air contamination, and to prevent reduction in life expectancy of the butterfly valve 1. Furthermore, decrease in the semiconductor manufacturing efficiency can be prevented. Moreover, even if the rod 10 is rotated for several tens of millions of times, the magnetic fluid sealing portion 19 gets hardly degraded with its sealing performance, and thus the magnetic fluid sealing portion 19 has significantly high endurance against increase in number of rotation.

Further, communication of the through hole 16*b* and the insertion hole 8*d* enables the rod 10, which has been inserted in the through hole 16*b*, to be inserted into the insertion hole 8*d*. The rod 10 inserted in the insertion hole 8*d* is disposed on the valve hole 8*a* in a direction orthogonal to the flow path 30. Further, the insertion hole 8*d* is provided with a bush 20, and an inner circumferential surface 20*a* of this bush 20 constitutes a part of the inner circumferential surface of the insertion hole 8*d*. The bush 20 has high corrosion resistance and made of resin with high sliding ability, and thus smooth rotation of the rod 10 is ensured.

An upper end portion of the insertion hole 8*d* (a portion opening to the upper end face 8*e*) has a larger diameter than a portion formed with the bush 20, and as shown in FIG. 4, a first space 511 is formed between the outer circumferential surface of the rod 10 and the upper end portion of the insertion hole 8*d*. Further, a second space 512 is formed between the inner circumferential surface of the through hole 16*b* of the housing 16 and the outer circumferential surface of the rod 10, and the first space 511 and the second space 512 constitute the buffer space 51. Owing to the buffer space 51, even if sudden pressure drop occurs in the flow path 30, for example, an amount of gas sucked out to the flow path 30 from inside of the drive section 2 is increased more than that in a case of not providing the buffer space 51. Thus, pressure impact given to the magnetic fluid sealing portion 19 is lessened, thereby preventing breakage of the magnetic fluid sealing portion 19.

The rod 10 is formed to be of a columnar shape by shaving out a stainless steel (for example, SUS316L) as a non-magnetic corrosion-resistance alloy. On an outer circumferential surface of a portion of the rod 10 inserted in the insertion hole 8*d*, a plurality of recessed portions 10*a* to 10*e* arranged in an axial direction of the rod 10 are provided as shown in FIG. 5, and an inner circumferential surface (the inner circumferential surface 20*a* of the bush 20) of the insertion hole 8*d* and a plurality of the recessed portions 10*a* to 10*e* constitute a labyrinth seal 50. This labyrinth seal 50 reduces the amount of gas to be sucked out to the flow path 30 from the inside of the drive section 2 even when the sudden pressure drop occurs in the flow path 30, and thus sudden drop in the pressure in the drive section 2 can be prevented. Accordingly, the pressure impact to be given to the magnetic fluid sealing portion 19 can be lessened, thereby preventing breakage of the magnetic fluid sealing portion 19.

Further, the rod 10 is journaled by the bush 22 in a rotatable manner on one end inserted in the flow path 30 (a lower end in FIG. 2 and FIG. 3) as shown in FIG. 2 and FIG. 3. The bush 22 has high corrosion resistance and made of resin with high sliding ability. As mentioned above, the rod 10 is journaled also by the ball bearings 21A and 21B, and accordingly, the rod 10 is journaled on both ends by the ball bearings 21A and 21B, and the bush 22. The rod 10 is thus journaled on both ends, so that a central axis for rotation is stabilized and the rod 10 is hardly wobbled.

A portion of the rod 10 inserted in the flow path 30 is provided with a valve-element mounting portion 10*f*, and the butterfly valve element 9 is joined to this valve-element mounting portion 10*f*. The butterfly valve element 9 is formed to be of a disklike shape by shaving out a stainless-steel having corrosion-resistance and thermal resistance. An outer diameter is almost equal to the inner diameter of the valve hole 8a, so that a clearance between the outer circumference of the butterfly valve element 9 and an inner wall of the valve hole 8a is made extremely small.

The butterfly valve element 9 is joined to the rod 10 by screws 25A, 25B, and 25C and washers 26A, 26B, and 26C as shown in FIG. 2, for example. Herein, all the three screws 25A, 25B, and 25C are the same type of screw, and all the three washers 26A, 26B, and 26C are the same type of washer.

The butterfly valve element 9 is joined to the rod 10, and thus the rod 10 connected to the rotary shaft 11a via the coupling 17 is rotated in association with rotation of the rotary shaft 11a of the DD motor 11 about the axis RA, so that the butterfly valve element 9 is also rotated. For example, the butterfly valve 1 shown in FIG. 2 and FIG. 3 is in a state of a fully-valve-closed position in which the butterfly valve element 9 blocks the valve hole 8a. When the rotary shaft 11a of the DD motor 11 is rotated in a forward direction K by 90 degrees about the axis RA from this state, the rod 10 is rotated in the direction K to rotate the butterfly valve element 9 in the same direction by 90 degrees. Thus, the butterfly valve element 9 is in the fully-open position. This fully-open position of the butterfly valve element 9 leads to opening of the flow path 30, which results in discharge of a large amount of process gas from the vacuum chamber 32 by the vacuum pump 33.

On the other hand, while the butterfly valve element 9 is in the fully-open position, when the rotary shaft 11a of the DD motor 11 is rotated about the axis RA in a backward direction −K as a reverse direction from the direction of valve opening by 90 degrees, the rod 10 is rotated in the −K direction. In accordance with rotation, the butterfly valve element 9 is positioned in the fully-closed position. Herein, when the butterfly valve element 9 is in the fully-closed position, there is provided an extremely small clearance between the outer circumferential surface of the butterfly valve element 9 and the inner wall of the valve hole 8a, and accordingly, the flow path 30 is not completely sealed. In other words, the butterfly valve element 9 takes a role of an aperture. Therefore, even when the butterfly valve element 9 is in the fully-closed position, the vacuum chamber 32 is not completely halted with discharging but is continuously discharged. This is because only the pressure in the vacuum chamber 32 has to be controlled in the ALD, and the flow path 30 is not necessary to be completely sealed.

Next, protection of the magnetic fluid sealing portion 19 is explained in view of corrosion resistance and pressure resistance.

Firstly, protection of the magnetic fluid sealing portion 19 is explained in view of the corrosion resistance. A magnetic fluid configuring the magnetic fluid sealing portion 19 has low corrosion resistance, and thus has a possibility of corrosion by contact with the process gas. To address this, the butterfly valve 1 is supplied with purge gas (for example, nitrogen gas) for preventing the process gas from reaching the magnetic fluid sealing portion 19. The purge gas is to be supplied to the butterfly valve 1 in a manner that a purge gas flow path 60 extending from a purge gas supply source 61 is connected between the magnetic fluid sealing portion 19 and the flow path 30 as shown in FIG. 1. A flow rate is 500 cc to 1000 cc per minute, for example, and a pressure value is set about a several KPa as an absolute pressure.

The purge gas flow path 60 is configured with a pipe 65 and an inner flow path 44 (see FIG. 4) configured inside the valve section 3 of the butterfly valve 1. The pipe 65 is provided with an opening and closing valve 62, a flow rate controller 63, and a pressure gauge 64 in this order from an upstream side when the purge gas supply source 61 is defined to be positioned upstream. The opening and closing valve 62 shuts off supply of the purge gas to the butterfly valve 1 in a valve-closed state. On the other hand, in a valve-open state, the purge gas is allowed to be supplied to the butterfly valve 1. The flow rate controller 63 can control a flow rate of the purge gas to be supplied to the butterfly valve 1 based on a flow rate command F11 which is output from the control device 70. The pressure gauge 64 is, for example, a pressure sensor of a strain-gauge type to measure a pressure value in the purge gas flow path 60. The opening and closing valve 62, the pressure gauge 64, and the flow rate controller 63 are connected to the control device 70.

The control device 70 is embedded with a CPU 701, a storage means 702, and a communication means 703. The storage means 702 stores a monitoring program to monitor the pressure value of the purge gas flow path 60 which is measured by the pressure gauge 64. Further, the measured value measured by the pressure gauge 64 and a flow rate value measured by the flow rate controller 63 may be stored. The opening and closing valve 62, the pressure gauge 64, and the flow rate controller 63 are connected to the control device 70 by the communication means 703 by wireless or with wire.

A CPU 701 is electrically connected with the storage means 702 and the communication means 703, and according to a monitoring program stored in the storage means 702, the CPU 701 performs valve-opening or valve-closing operation of the opening and closing valve 62, measurement of the pressure value by the pressure gauge 64, storing the measured pressure value in the storage means 702, control and flow-rate measurement of the flow rate controller 63, storing the measured flow rate in the storage means 702, and alarm notification to an external device via the communication means 703 which will be explained later. Herein, measurement of the pressure value by the pressure gauge 64 is performed by sampling the pressure value per predetermined unit of time (for example, a several milliseconds). Further, the alarm notification may be performed by providing a display device in the control device 70 to display an alarm notice on the display device.

The pipe 65 is connected to the valve section 3 on a downstream side of the pressure gauge 64. To be specific, to the valve body 8, an input port 41 for supplying the purge gas is connected via a purge gas pipe 42, and the pipe 65 is connected to this input port 41 as shown in FIG. 3. Thus, the pipe 65 is connected to the inner flow path 44.

The inner flow path 44 is, as shown in FIG. 4, configured with a flow path 42a formed in the purge gas pipe 42, a communication hole 8g, an insertion hole 8f (a space 81) in which a heat exchanger 43 explained below is inserted, a hollow portion 43a of the heat exchanger 43, and communication holes 8h and 8i.

The purge gas pipe 42 extends to the valve body 8 from the input port 41. Thereby, the purge gas supplied to the input port 41 passes through the flow path 42a of the purge gas pipe 42 and flows into the valve body 8.

The insertion hole 8f is drilled from the upper end face 8e of the valve body 8 to a vicinity of the heater 27A with an inclination angle with respect to the axis RA. This insertion hole 8f is communicated with the flow path 42a of the purge gas 42 by the communication hole 8g and also communicated with the insertion hole 8d of the valve body 8 by the communication holes 8h and 8i.

The insertion hole 8f is inserted with a heat exchanger 43 of a cylindrical shape having an outer diameter slightly smaller than an inner diameter of the insertion hole 8f and having a hollow portion 43a therein. The heat exchanger 43 thus has the outer diameter slightly smaller than the inner diameter of the insertion hole 8f, so that there is formed a space 81 between an outer circumferential surface of the heat exchanger 43 and the insertion hole 8f. Then, an end portion of the heat exchanger 43 on a side of the upper end face 8e of the valve body 8 is attached with an O ring 45. The 0 ring 45 compressed by the insertion hole 8f hermetically seals the space 81. The inner flow path 44 is communicated with the flow path 30 by the insertion hole 8d of the valve body 8.

The purge gas is to flow in the above-mentioned purge gas flow path 60 as explained below. The purge gas supplied from the purge gas supply source 61 and flowing in the pipe 65 is introduced into the flow path 42a of the purge gas pipe 42 from the input port 41. Thereafter, the purge gas passes through the communication hole 8g and reaches the insertion hole 8f. At this time, the O ring 45 prevents the purge gas from flowing on the side of the upper end face 8e of the valve body 8. As a result of this, the purge gas flows through the insertion hole 8f (the space 81) toward the lowest end on the heater 27A side. The purge gas having reached the lowest end of the insertion hole 8f (the space 81) passes through the hollow portion 43a of the heat exchanger 43 and further flows toward the upper end face 8e of the valve body 8. The heat exchanger 43 is heated to about 200° C. by the heater 27A, and thus the purge gas is also heated when the gas passes through the insertion hole 8f (the space 81) and the hollow portion 43a. The purge gas having passed the hollow portion 43a and reached the upper end face 8e of the valve body 8 further passes through the communication holes 8h and 8i to the insertion hole 8d. The magnetic fluid sealing portion 19 is formed above the insertion hole 8d, and thus the purge gas would not flow in the DD motor 11 side, and the purge gas having reached the insertion hole 8d is output to the flow path 30.

The purge gas is thus output to the flow path 30 via the insertion hole 8d, so that the process gas which intends to flow outside the butterfly valve 1 through the insertion hole 8d from the flow path 30 is pushed back into the flow path 30. Therefore, the process gas can be prevented from reaching the magnetic fluid sealing portion 19, so that the magnetic fluid can be prevented from getting corroded due to contact with the process gas.

Herein, the process gas is in a solid state or a liquid state in a normal temperature, and thus the process gas is heated to about 200° C. for use, for example. When the temperature of the purge gas is low, the process gas could be solidified or liquefied while the purge gas and the process gas are contacted, which could cause deposition of formed products of the solidified process gas or the like in the flow path 30 and in the pipe 34. However, in the present embodiment, when the purge gas is to flow in the inner flow path 44, the purge gas is heated to about 160° C. by the heat exchanger 43, and thus there is no possibility of solidification or liquefication of the process gas even if the purge gas comes to contact with the process gas.

Next, protection of the magnetic fluid sealing portion 19 in view of pressure resistance in view of pressure resistance is explained. A magnetic fluid forming the magnetic fluid sealing portion 19 is held by a magnetic force of the magnetic member 18. Accordingly, when the magnetic fluid sealing portion 19 is loaded with a pressure exceeding the force held by this magnetic force, the magnetic member 18 can no longer hold the magnetic fluid, which could result in breakage of the magnetic fluid sealing portion 19.

The following case is considered as a situation in which the excessive pressure is loaded on the magnetic fluid sealing portion 19. For example, in a state where the vacuum pump 33 is out of operation, namely, in a state where the flow path 30 is not under the negative pressure, supply of the purge gas to the butterfly valve 1 leads to accumulation of the purge gas in the flow path 30. This accumulation of the purge gas in the flow path 30 causes increase in the pressure inside the buffer space 51 through the insertion hole 8d. By this increase in the pressure in the buffer space 51, the magnetic fluid sealing portion 19 could be loaded with excessive pressure and broken.

On the other hand, during operation of the vacuum pump 32, namely, while the flow path 30 is under the negative pressure, when the purge gas has not been supplied for a long term, the pressure in the flow path 30 further drops, so that the flow path 30 goes into the highly vacuumed state. This highly vacuumed state of the flow path 30 results in suction of the gas in the drive section 2 into the flow path 30, so that the drive section 2 is also under the highly vacuumed state. This further leads to volatilization of base oil of the magnetic fluid constituting the magnetic fluid sealing portion 19, which could cause breakage of the magnetic fluid sealing portion 19. Accordingly, for protection of the magnetic fluid sealing portion 19, start or halt of supplying the purge gas needs to be controlled with reference to the pressure value of the purge gas flow path 60.

Further, when the too-large pressure impact is given to the butterfly valve 1 by the sudden pressure variation in the vacuum chamber 32, the holding force of the magnetic member 18 cannot endure the pressure impact, so that the magnetic fluid sealing portion 19 could be broken.

For example, when the pressure in the vacuum chamber 32 suddenly drops due to erroneous operation of the vacuum pump 33 by an operator and others, sudden pressure drop occurs in the flow path 30. The drive section 2 has been supplied with the purge gas from the input port 41, but a supply amount of the purge gas cannot catch up with this sudden pressure drop in the flow path 30, so that the gas in the drive section 2 is abruptly sucked out to the flow path 30, resulting in sudden drop in the pressure in the drive section 2. This sudden drop in the pressure in the drive section 2 causes excessively large pressure impact given to the magnetic fluid sealing portion 19, which could cause breakage and malfunction of the magnetic fluid sealing portion 19.

Further, for example, when the pressure in the vacuum chamber 32 suddenly rises due to erroneous operation of the vacuum pump 33 by an operator and others, sudden pressure increase occurs in the flow path 30. This sudden pressure increase in the flow path 30 leads to abrupt inflow of the process gas from the flow path 30 to the buffer space 51, so that the pressure in the buffer space 51 is suddenly increased. This causes excessively large pressure impact given to the magnetic fluid sealing portion 19, which could cause breakage and malfunction of the magnetic fluid sealing portion 19.

Furthermore, in a case of loading the pressure equal to or more than a pressure resistance value of the magnetic fluid sealing portion 19, there is a possibility of breakage of the magnetic fluid sealing portion 19, and moreover, a possibility of breakage of the butterfly valve 1 itself. Therefore, for protection of the magnetic fluid sealing portion 19, it is necessary to monitor whether the pressure value in the flow path 30 causes abnormality (in other words, whether there is generated the pressure impact or a pressure equal to or more than the pressure resistance value).

In response to this, the butterfly valve 1 according to the present embodiment is configured to control start or halt of supplying the purge gas and to monitor whether the pressure value in the flow path 30 causes abnormality by the above-mentioned monitoring program. An operation of the monitoring program is explained below with FIG. 6. FIG. 6 is a flow chart indicating an operation procedure of the monitoring program.

Firstly, a pressure value P in the purge gas flow path 60 is measured by the pressure gauge 64 (S11). The purge gas flow path 60 is connected between the magnetic fluid sealing portion 19 and the flow path 30 in the butterfly valve 1, and therefore, measurement and monitoring of the pressure value in the purge gas flow path 60 corresponds to measurement and monitoring of the pressure loaded on the magnetic fluid sealing portion 19. Further, the purge gas flow path 60 is communicated with the flow path 30 by the insertion hole 8d, and thus an abnormal state of the flow path 30 can also be detected by measuring and monitoring the pressure value in the purge gas flow path 60.

Subsequently, determination whether the measured pressure value P is smaller than a first threshold value A is performed (S12). This first threshold value A is, for example, an atmospheric pressure. By determining whether the pressure value P is smaller than the atmospheric pressure, the program monitors whether the vacuum pump 33 is operated (namely, whether the flow path 30 is under the negative pressure).

When the vacuum pump 33 is out of operation, the pressure value in the flow path 30 and the purge gas flow path 60 becomes similar to the atmospheric pressure. When the purge gas is supplied in this state, as mentioned above, the purge gas is accumulated in the buffer space 51 to increase the pressure, which could result in breakage of the magnetic fluid sealing member. Therefore, when the pressure value P is determined to be equal to or more than the first threshold value A (the atmospheric pressure) (S12: NO), the opening and closing valve 62 is brought in the valve-closed state (S21). Namely, in the valve-closed state of the opening and closing valve 62, that state is maintained and the purge gas is not supplied to the butterfly valve 1. On the other hand, when the opening and closing valve 62 is in the valve-open state, the valve is brought into the valve-closed state to halt supply of the purge gas.

During operation of the vacuum pump 33, the flow path 30 and the purge gas flow path 60 are under negative pressure. While the purge gas has not been supplied for a long term in this state, as mentioned above, the base oil of the magnetic fluid constituting the magnetic fluid sealing portion 19 is volatilized, which could cause breakage of the magnetic fluid sealing portion 19. Accordingly, when the pressure value P is determined to be smaller than the first threshold value A (the atmospheric pressure) (S12: YES), the opening and closing valve 62 is brought to be in the valve-open state (S13). Namely, when the opening and closing valve 62 is in the valve-open state, that state is maintained and the purge gas is kept supplied to the butterfly valve 1. On the other hand, when the opening and closing valve 62 is in the valve-closed state, the valve is brought into the valve-open state to start supply of the purge gas. The monitoring program can prevent breakage of the magnetic fluid sealing portion 19 by controlling start or halt of supplying the purge gas as mentioned above for the purpose of protecting the magnetic fluid sealing portion 19.

Subsequently, the monitoring program stores the pressure value P of the purge gas flow path 60 at the time when the pressure in the purge gas flow path 60 is stabilized by the control device 70 (S14: YES) as a steady pressure value P0 in the storage means 702 (S22).

Subsequently, the monitoring program determines whether the pressure impact is given to the magnetic fluid sealing portion 19 (S15). Specifically, the control device 70 obtains the pressure value per predetermined unit of time (for example, per several milliseconds) by the pressure gauge 64, and the control device 70 obtains an absolute value of a gap between the current pressure value P (the pressure value obtained for n-th time) and the previously obtained pressure value Pb (the pressure value obtained for (n-1)-th time). The larger the instant pressure variation in the purge gas flow path 60 is, the larger the absolute value of the gap between the pressure value P and the pressure value Pb becomes, and this magnitude of the absolute value corresponds to a magnitude of the pressure impact. Accordingly, the monitoring program determines whether the pressure impact occurs by determining whether this absolute value is equal to or more than a predetermined second threshold value B. This second threshold value B is, for example, a specified value of pressure-impact resistance of the magnetic fluid sealing portion 19 per unit of time. When the absolute value of the gap between the pressure value P and the pressure value Pb is equal to or more than the second threshold value B, it is determined there is occurred abnormality in the pressure value of the flow path 30 (the purge gas flow path 60). Namely, the pressure impact is determined to occur (S15: YES). At this time, the control device 70 performs alarm notification by the communication means 703 (S23). On the other hand, when the absolute value of the gap between the pressure value P and the pressure value Pb is smaller than the second threshold value B, the pressure value of the flow path 30 (the purge gas flow path 60) is determined to be normal. In other words, it is determined that there is no pressure impact given to the magnetic fluid sealing portion 19 (S15: NO).

Subsequently, the monitoring program determines whether the magnetic fluid sealing portion 19 is loaded with the pressure equal to or more than the pressure resistance value of the magnetic fluid sealing portion 19 (S16). Specifically, the control device 70 monitors whether the pressure value P measured per predetermined unit of time (for example, per several milliseconds) is equal to or more than a pressure resistance value C and determines the pressure value of the flow path 30 (the purge gas flow path 60) as abnormal when the pressure value P is equal to or more than the pressure resistance value C (S16: YES). At this time, the control device 70 performs the alarm notification through the communication means 703 (S24). On the other hand, when the pressure value P is smaller than the pressure resistance value C, the pressure value of the flow path 30 (the purge gas flow path 60) is determined to be normal (S16: NO). The monitoring program can thus monitor whether there occurs abnormality in the pressure value of the flow path 30 (the purge gas flow path 60) (whether the pressure impact or the pressure equal to or more than the pressure resistance value is generated) as mentioned above.

Subsequently, the monitoring program performs determination whether there occurs abnormality in the flow rate of the purge gas in the purge gas flow path 60 (S17). Specifically, while the flow rate controller 63 regularly monitors a flow rate value (a controlled flow rate value F21) of the purge gas in the purge gas flow path 60, the program compares the controlled flow rate value F21 and a flow rate command F11 output from the control device and determines whether the controlled flow rate value F21 and the flow rate command F11 are different from each other. When the controlled flow rate value F21 is different from the flow rate command F11, the flow rate of the purge gas is determined to be abnormal (S17: YES). At this time, the control device 70 performs alarm notification through the communication means 703 (S25). On the other hand, when the controlled flow rate value F21 is same as the flow rate command F11, the flow rate of the purge gas is determined to be normal (S17: NO). Herein, determination of whether the controlled flow rate value F21 is different from the flow rate command F11 is determined in view of errors. For example, when the controlled flow rate value F21 is determined to have an error equivalent to specification accuracy of the flow rate controller 63 in the flow rate command F11, the controlled flow rate value F21 is determined to be same as the flow rate command F11 and the flow rate of the purge gas is determined to be normal as long as such a gap is within a range of error even if the controlled flow rate value F21 is not exactly equal to the flow rate command F11. The above-mentioned error is one example, and this error in the flow rate of the purge gas may vary depending on the flow rate of the process gas flowing through the flow path 30, and others. When the controlled flow rate value F21 is different from the flow rate command F11, the pressure inside the purge gas flow path 60 cannot be maintained to the steady pressure value P0. Accordingly, determination whether the flow rate value of the purge gas in the purge gas flow path 60 is abnormal is carried out as mentioned above, and thus monitoring is performed so that the pressure inside the purge gas flow path 60 is maintained to the steady pressure value P0.

Subsequently, the monitoring program carries out determination whether the pressure value in the flow path 30 and in the purge gas flow path 60 is unstable (S18). The pressure value in the flow path 30 is considered to become unstable due to abnormality in the vacuum chamber 32, the vacuum pump 33, and other equipment. Unstableness in the pressure value has no direct bad influence on the magnetic fluid sealing portion 19 in some cases, but there is a case that a problem occurs in a process of wafer deposition in the vacuum chamber 32, and thus the monitoring program needs to perform monitoring.

Specifically, the control device 70 obtains an absolute value of a gap between the pressure value P measured per predetermined unit of time (for example, per several milliseconds) and the steady pressure value P0 stored in the storage means 702 (see S22 in FIG. 6) and determines whether the absolute value is equal to or more than a third threshold value D. This third threshold value D is, for example, a variation range of the pressure used in the semiconductor manufacturing process. When the absolute value of the gap between the pressure value P and the steady pressure value P0 is equal to the third threshold value D or more, the pressure value in the flow path 30 (the purge gas flow path 60) is determined to be unstable (S18: YES). At this time, the control device 70 performs alarm notification by the communication means 703 (S26). On the other hand, when the absolute value of the gap between the pressure value P and the steady pressure value P0 is smaller than the third threshold value D, the pressure value in the flow path 30 (the purge gas flow path 60) is determined to be normal (S18: NO).

Subsequently, the monitoring program confirms presence or absence of the alarm (S19). Among the alarm notifications performed in steps S23, S24, S25, and S26 in FIG. 6, when any one of the alarm notifications is carried out (S19: YES), the butterfly valve element 9 of the butterfly valve 1 is positioned to the valve-fully-closed position (S20). Thus, the process gas flowing through the pipe 34 is shut off to keep safety. Thereafter, the monitoring program is ended. On the other hand, when no alarm notifications are given (S19: NO), the process returns to S11 in FIG. 6, and monitoring of the pressure value in the flow path 30 (the purge gas flow path 60) is continued along the flowchart.

As explained above, the butterfly valve 1 according to the present embodiment is characterized in that (1) a butterfly valve comprises: a motor (for example, a DD motor 11); a flow path 30 in which a control fluid (for example, process gas) flows; a rod 10 having one end joined to the motor (for example, the DD motor 11) and the other end inserted in the flow path 30; and a butterfly valve element 9 joined to the rod 10 in the flow path 30. The butterfly valve 1 comprises a magnetic fluid sealing portion 19 between the motor (the DD motor 11) and the flow path 30, the magnetic fluid sealing portion 19 is configured to prevent leakage of the control fluid (the process gas) from the flow path 30 to the motor (the DD motor 11) through an inserted portion (for example, an insertion hole 8d) of the flow path 30 in which the rod 10 is inserted, the butterfly valve 1 comprises a purge gas flow path 60 to supply purge gas to the butterfly valve 1, the purge gas preventing inflow of the control fluid to the magnetic fluid sealing portion 19 through the inserted portion (the insertion hole 8d) from the flow path 30. The purge gas flow path 60 is provided with an opening and closing valve 62 to open and close the purge gas flow path 60 and a pressure gauge 64 to measure a pressure value of the purge gas flow path 60 in this order from an upstream side. The purge gas flow path 60 is connected between the magnetic fluid sealing portion 19 and the flow path 30 of the butterfly valve 1 and communicated with the flow path 30 through the inserted portion (the insertion hole 8d) on a downstream side of the pressure gauge 64. The butterfly valve 1 comprises a control device 70 to control at least the opening and closing valve 62, and the control device 70 includes a monitoring program to monitor the pressure value P.

The above-mentioned butterfly valve 1 is provided with the control device 70, and the control device 70 is to control the opening and closing valve 62 at least configured to open and close the purge gas flow path 60 and also to measure the pressure value in the purge gas flow path 60 and to monitor the pressure value by the monitoring program. The purge gas flow path 60 is connected between the magnetic fluid sealing portion 19 and the flow path 30 of the butterfly valve 1 on a downstream side of the pressure gauge 64, and therefore, measurement and monitoring of the pressure value in the purge gas flow path 60 corresponds to measurement and monitoring of the pressure loaded on the magnetic fluid sealing portion 19.

The control device 70 controls the opening and closing valve 62 while the device measures and monitors the pressure value in the purge gas flow path 60 (in other words, the device measures and monitors the pressure loaded on the magnetic fluid sealing portion 19), and accordingly, start and halt of supplying the purge gas can be controlled. Owing to this, the magnetic fluid sealing portion 19 can be prevented from being loaded with excessive pressure, thereby preventing breakage of the magnetic fluid sealing portion 19. Further, the purge gas flow path 60 is communicated with the flow path 30 by the inserting portion (the insertion hole 8d) in which the rod 10 is inserted, so that an abnormal state of the flow path 30 can also be detected by measuring and monitoring the pressure value in the purge gas flow path 60.

(2) In the above butterfly valve 1, preferably, the monitoring program (for example, steps S11 to S26 in FIG. 6) outputs a command of opening the opening and closing valve 62 when the pressure value P is smaller than a predetermined first threshold value A (for example, atmospheric pressure).

When the purge gas is supplied to the butterfly valve 1 while the vacuum pump 33 is out of operation, namely, while the flow path 30 in the butterfly valve 1 is not under the negative pressure, the purge gas is accumulated in the flow path 30, causing increase in the pressure inside the butterfly valve 1. Further, when supply of the purge gas has been halted for a long time while the vacuum pump 33 is operated, namely, while the flow path 30 of the butterfly valve 1 is under the negative pressure, the pressure inside the flow path 30 drops, so that the butterfly valve 1 falls in a highly vacuumed state. Consequently, when the pressure inside the butterfly valve 1 is increased or turned into the negative pressure, the excessive pressure is loaded on the magnetic fluid sealing portion 19, so that the magnetic fluid sealing portion 19 could be broken.

According to the butterfly valve 1 as described in the above (2), when the pressure value P is smaller than the predetermined first threshold value A (for example, atmospheric pressure), it can be determined that the vacuum pump 33 is under operation. When the pressure value P is equal to or more than the predetermined first threshold value A (for example, atmospheric pressure), it can be determined that the vacuum pump 33 is out of operation. Accordingly, the opening and closing valve 62 is controlled based on a result of whether the pressure value P is smaller than the predetermined first threshold value A (for example, atmospheric pressure), and thus start and halt of supplying the purge gas can be controlled. Thus, it is possible to prevent the magnetic fluid sealing portion 19 from being loaded with the excessive pressure and to prevent breakage of the magnetic fluid sealing portion 19.

(3) In the above-mentioned butterfly valve, preferably, the monitoring program (steps S11 to S26 in FIG. 6) obtains the pressure value per predetermined unit of time (for example, per several milliseconds) and determines the pressure value P is abnormal when an absolute value of a gap between the pressure value P obtained in n-th time and the pressure value Pb obtained in (n−1)-th time is equal to or more than a predetermined second threshold value B.

For example, when the pressure in the vacuum chamber 32 suddenly drops or rises due to erroneous operation of the vacuum pump 33 by an operator and others, the pressure in the flow path 30 of the butterfly valve 1 suddenly drops or rises. Such a pressure impact could apply an excessive pressure impact to the magnetic fluid sealing portion 19 via the insertion hole 8d of the butterfly valve 1, which could result in breakage of the magnetic fluid sealing portion 19.

The butterfly valve 1 according to the above (3) obtains each pressure value per predetermined unit of time (for example, per several milliseconds) and obtains an absolute value of a gap between a pressure value P obtained in n-th time and a pressure value Pb obtained in (n−1)-th time. The larger the instant pressure variation becomes, the larger the absolute value of the gap between the pressure value P and the pressure value Pb becomes. This absolute value corresponds to a magnitude of the pressure impact.

Accordingly, it is determined whether the pressure impact has occurred by determining whether this absolute value is equal to or more than a predetermined second threshold value B. The second threshold value B is, for example, a specified value of a resistance against the pressure impact of the magnetic fluid sealing portion 19 per unit of time. When the absolute value of the gap between the pressure value P and the pressure value Pb is equal to or larger than the second threshold value B, the pressure value of the purge gas flow path 60 is determined to be abnormal. To be specific, it is possible to determine that the pressure impact occurs. Based on this, when valve-closing of the butterfly valve 1 or the like is to be performed, it is possible to lessen the possibility of applying the excessive pressure impact to the magnetic fluid sealing portion 19 to cause breakage of the magnetic fluid sealing portion 19.

(4) In the above-mentioned butterfly valve 1, preferably, the monitoring program (steps S11 to S26 in FIG. 6) determines that the pressure value P is abnormal when the pressure value P is equal to or more than a pressure resistance value C of the magnetic fluid sealing portion 19.

For example, also in a case that the magnetic fluid sealing portion 19 is loaded with the pressure equal to or more than the pressure resistance value of the magnetic fluid sealing portion 19 due to erroneous operation of the vacuum pump 33 by an operator or the like, there is a possibility of breakage in the magnetic fluid sealing portion 19 and further a possibility of breakage in the butterfly valve itself. When the pressure value P of the purge gas flow path 60 is equal to or more than the pressure resistance value C of the magnetic fluid sealing portion 19, it is determined that the magnetic fluid sealing portion 19 is loaded with the pressure equal to or more than the pressure resistance value C. Therefore, according to the butterfly valve 1 described in the above (4), presence or absence of the abnormality in the pressure value of the flow path 30 can be monitored by determining whether the pressure value is equal to or more than the pressure resistance value C of the magnetic fluid sealing portion 19. By performing valve closing or the like of the butterfly valve 1, based on this, for example, it is possible to prevent the magnetic fluid sealing portion 19 from being loaded with the excessive pressure and to lessen the possibility of breakage of the magnetic fluid sealing portion 19.

(5) In the above-mentioned butterfly valve 1, preferably, the control device 70 is provided with a storage means 702 to store the pressure value P, which has been determined to be under a stable state in the purge gas flow path 60 by the control device 70, as a steady pressure value P0, and the monitoring program (steps S11 to S26 in FIG. 6) determines that the pressure value P is abnormal when an absolute value of a gap between the pressure value P and the steady pressure value P0 is equal to or more than a predetermined third threshold value D.

It is assumed that the pressure value in the flow path 30 of the butterfly valve 1 becomes unstable due to malfunction in the vacuum chamber 32, the vacuum pump 33, and other equipment. Unstableness in the pressure value may not directly have a bad influence on the magnetic fluid sealing portion 19, but there is a case of developing a problem in a deposition process in the vacuum chamber 32.

To address the above, in the butterfly valve 1 in the above (5), the absolute value of the gap between the pressure value P and the steady pressure value P0 is obtained, and when the absolute value is equal to or more than the third threshold value D, the pressure value P is determined to be abnormal, so that the deposition process can be prevented from problems. Herein, the third threshold value D is, for example, a variation range of a pressure used in the semiconductor manufacturing process. Determination of abnormality in the pressure value P may be made instantly when the above-mentioned absolute value is equal to or more than the third threshold value D only one time, but alternatively, determination of abnormality in the pressure value P may be made when the above-mentioned absolute value is determined to be equal to or more than the third threshold value D for predetermined number of times.

(6) In the above-mentioned butterfly valve 1, preferably, the purge gas flow path 60 is provided between the opening and closing valve 62 and the pressure gauge 64 with a flow rate controller 63 configured to control a flow rate (a controlled flow rate value F21) of the purge gas based on a flow rate command F11 output from the control device 70 and to detect a flow rate value (the controlled flow rate value F21) of the purge gas, and the monitoring program (steps S11 to S26 in FIG. 6) determines abnormality in the flow rate value (the controlled flow rate value F21) when the flow rate value (the controlled flow rate value F21) is different from the flow rate command F11.

When the flow rate value of the purge gas (the controlled flow rate value F21) is different from the flow rate command F11, the pressure in the purge gas flow path 60 cannot be maintained to the steady pressure value P0. To address this, determination of presence or absence of the abnormality in the flow rate value of the purge gas in the purge gas flow path 60 makes it possible to monitor the pressure in the purge gas flow path 60 to be kept at the steady pressure value P0.

The present embodiment is only an illustration and gives no any limitation to the present invention. Therefore, the present invention can be naturally made with various improvements and modifications without departing from the scope of the disclosure. For example, in the present embodiment, even when the butterfly valve element 9 is in the valve-fully-closed position, the flow path 30 is not completely sealed. Alternatively, the flow path may be completely sealed by providing a valve seat on the valve hole 8*a* so that the butterfly valve element 9 is brought into contact with the valve seat.

REFERENCE SIGNS LIST

1 Butterfly valve
2 Drive section
3 Valve section
8*d* Insertion hole (one example of an inserted portion)
9 Butterfly valve element
10 Rod
11 DD motor (one example of a motor)
18 Magnetic member
19 Magnetic fluid sealing portion
30 Flow path
32 Vacuum chamber
33 Vacuum pump
34 Pipe

The invention claimed is:

1. A butterfly valve comprising:
a motor;
a flow path in which a control fluid flows;
a rod having one end joined to the motor and the other end inserted in the flow path; and
a butterfly valve element joined to the rod in the flow path, wherein
the butterfly valve comprises a magnetic fluid sealing portion between the motor and the flow path,
the magnetic fluid sealing portion is configured to prevent leakage of the control fluid from the flow path to the motor through an inserted portion of the flow path in which the rod is inserted,
the butterfly valve comprises a purge gas flow path to supply purge gas to the butterfly valve, the purge gas preventing inflow of the control fluid to the magnetic fluid sealing portion through the inserted portion from the flow path,
the purge gas flow path is provided with an opening and closing valve to open and close the purge gas flow path and a pressure gauge to measure a pressure value of the purge gas flow path in this order from an upstream side,
the purge gas flow path is connected between the magnetic fluid sealing portion and the flow path of the butterfly valve and communicated with the flow path through the inserted portion on a downstream side of the pressure gauge,
the butterfly valve comprises a control device to control at least the opening and closing valve, and
the control device includes a monitoring program to monitor the pressure value.

2. The butterfly valve according to claim 1, wherein the monitoring program outputs a command of opening the opening and closing valve when the pressure value is smaller than a predetermined first threshold value.

3. The butterfly valve according to claim 2, wherein the monitoring program obtains the pressure value per predetermined unit of time and determines the pressure value is abnormal when an absolute value of a gap between the pressure value obtained in n-th time and the pressure value obtained in (n−1)-th time is equal to or more than a predetermined second threshold value.

4. The butterfly valve according to claim 2, wherein the monitoring program determines that the pressure value is abnormal when the pressure value is equal to or more than a pressure resistance value of the magnetic fluid sealing portion.

5. The butterfly valve according to claim 2, wherein
the control device is provided with a storage means to store the pressure value, which has been determined to be under a stable state in the purge gas flow path by the control device, as a steady pressure value, and
the monitoring program determines that the pressure value is abnormal when an absolute value of a gap between the pressure value and the steady pressure value is equal to or more than a predetermined third threshold value.

6. The butterfly valve according to claim 2, wherein
the purge gas flow path is provided between the opening and closing valve and the pressure gauge with a flow rate controller configured to control a flow rate of the purge gas based on a flow rate command output from the control device and to detect a flow rate value of the purge gas, and
the monitoring program determines abnormality in the flow rate value when the flow rate value is different from the flow rate command.

7. The butterfly valve according to claim 1, wherein the monitoring program obtains the pressure value per predetermined unit of time and determines the pressure value is abnormal when an absolute value of a gap between the pressure value obtained in n-th time and the pressure value obtained in (n−1)-th time is equal to or more than a predetermined second threshold value.

8. The butterfly valve according to claim 1, wherein the monitoring program determines that the pressure value is abnormal when the pressure value is equal to or more than a pressure resistance value of the magnetic fluid sealing portion.

9. The butterfly valve according to claim 1, wherein
the control device is provided with a storage means to store the pressure value, which has been determined to be under a stable state in the purge gas flow path by the control device, as a steady pressure value, and the monitoring program determines that the pressure value is abnormal when an absolute value of a gap between the pressure value and the steady pressure value is equal to or more than a predetermined third threshold value.

10. The butterfly valve according to claim 1, wherein the purge gas flow path is provided between the opening and closing valve and the pressure gauge with a flow rate controller configured to control a flow rate of the purge gas based on a flow rate command output from the control device and to detect a flow rate value of the purge gas, and the monitoring program determines abnormality in the flow rate value when the flow rate value is different from the flow rate command.

* * * * *